(12) United States Patent
Nakamura

(10) Patent No.: US 11,516,099 B2
(45) Date of Patent: Nov. 29, 2022

(54) RESOURCE MONITORING SYSTEM, RESOURCE MONITORING METHOD, AND INFORMATION STORAGE MEDIUM

(71) Applicant: Kabushiki Kaisha Yaskawa Denki, Kitakyushu (JP)

(72) Inventor: Tomoyuki Nakamura, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 16/569,721

(22) Filed: Sep. 13, 2019

(65) Prior Publication Data

US 2020/0092182 A1    Mar. 19, 2020

(30) Foreign Application Priority Data

Sep. 14, 2018   (JP) .............................. JP2018-172882

(51) Int. Cl.
| | | |
|---|---|---|
| *H04L 12/26* | (2006.01) | |
| *G06F 15/173* | (2006.01) | |
| *H04L 9/32* | (2006.01) | |
| *G06F 21/00* | (2013.01) | |
| *G06F 15/16* | (2006.01) | |
| *H04L 15/16* | (2006.01) | |
| *H04L 43/065* | (2022.01) | |
| *H04L 43/045* | (2022.01) | |
| *H04L 43/0817* | (2022.01) | |

(52) U.S. Cl.
CPC .......... *H04L 43/065* (2013.01); *H04L 43/045* (2013.01); *H04L 43/0817* (2013.01)

(58) Field of Classification Search
CPC . H04L 43/065; H04L 43/045; H04L 43/0817; G06F 11/0766; G06F 11/3058; G06F 11/3065; G06F 11/324; G06F 11/323; G06F 11/3409; G06F 11/0736; G06F 11/3013; G05B 23/0267; G05B 19/042
See application file for complete search history.

(56) References Cited

U.S. PATENT DOCUMENTS

| | | | |
|---|---|---|---|
| 10,521,279 B2* | 12/2019 | Antony | ............. G06F 16/24568 |
| 11,092,955 B2* | 8/2021 | Cella | .................. G05B 19/4184 |
| 2001/0033143 A1* | 10/2001 | Matsumoto | ............ B25J 9/1674 |
| | | | 318/567 |

(Continued)

FOREIGN PATENT DOCUMENTS

| | | | | |
|---|---|---|---|---|
| CN | 105939334 B | * | 3/2021 | ............... G05B 1/01 |
| CN | 107111625 B | * | 3/2021 | .......... G06F 11/0754 |

(Continued)

OTHER PUBLICATIONS

Search Report dated Jan. 29, 2020, for corresponding EP Patent Application No. 19196350.3.

(Continued)

*Primary Examiner* — David R Lazaro
*Assistant Examiner* — Berhanu Shitayewoldetadik
(74) *Attorney, Agent, or Firm* — HEA Law PLLC

(57) ABSTRACT

A computer of a resource monitoring system is configured to execute an application for analyzing an operation of an industrial device. A use status acquisition module is configured to acquire a use status of a resource of the computer by the application. A display control module is configured to display the use status on a resource monitoring screen.

20 Claims, 12 Drawing Sheets

(56) References Cited

U.S. PATENT DOCUMENTS

| | | | | |
|---|---|---|---|---|
| 2002/0156884 | A1* | 10/2002 | Bertram | H04L 43/065 709/224 |
| 2004/0078376 | A1* | 4/2004 | Kusama | G06F 11/323 714/E11.181 |
| 2005/0043923 | A1* | 2/2005 | Forster | F16K 37/0091 702/184 |
| 2007/0050670 | A1* | 3/2007 | Shigemura | G06F 11/1076 714/6.32 |
| 2007/0192910 | A1* | 8/2007 | Vu | B25J 19/06 901/17 |
| 2008/0045157 | A1* | 2/2008 | Takahashi | H04L 43/0876 455/67.11 |
| 2008/0228755 | A1* | 9/2008 | Haga | G06F 11/3433 707/999.005 |
| 2008/0313248 | A1* | 12/2008 | Gustafsson | G05B 9/03 708/201 |
| 2009/0118843 | A1 | 5/2009 | Rahman et al. | |
| 2009/0132085 | A1* | 5/2009 | Sjostrand | G05B 19/4063 901/50 |
| 2010/0082505 | A1* | 4/2010 | Hollingsworth | G06N 5/02 706/11 |
| 2011/0093587 | A1* | 4/2011 | Toshima | H04L 43/045 709/224 |
| 2011/0258688 | A1* | 10/2011 | Petorson | G06F 11/3065 709/227 |
| 2012/0057563 | A1* | 3/2012 | Kiyoshima | H04L 1/0075 370/330 |
| 2012/0246319 | A1* | 9/2012 | Um | H04L 41/5054 709/226 |
| 2012/0284278 | A1* | 11/2012 | Ikegami | H04L 43/0817 707/741 |
| 2012/0284571 | A1* | 11/2012 | Stanko | G06F 11/0781 714/49 |
| 2012/0311368 | A1* | 12/2012 | Zhang | G06F 11/3055 713/340 |
| 2013/0188557 | A1* | 7/2013 | Gotou | H04L 12/66 370/328 |
| 2013/0246001 | A1* | 9/2013 | Uchida | G06F 11/0709 702/182 |
| 2013/0346597 | A1* | 12/2013 | Baumback | H04L 67/535 709/224 |
| 2014/0137121 | A1* | 5/2014 | Asakura | G06F 9/4881 718/102 |
| 2014/0160510 | A1* | 6/2014 | Kawasaki | H04L 43/0876 358/1.14 |
| 2014/0198420 | A1* | 7/2014 | Kojovic | H02H 1/04 361/86 |
| 2015/0106509 | A1* | 4/2015 | Lee | H04L 47/70 709/224 |
| 2015/0207628 | A1* | 7/2015 | Hilla | G06F 11/079 713/193 |
| 2015/0207689 | A1* | 7/2015 | Matsumoto | H04L 69/18 709/223 |
| 2015/0339016 | A1* | 11/2015 | Dong | G06F 8/38 715/777 |
| 2015/0381460 | A1* | 12/2015 | Matsuno | H04L 41/0668 370/241.1 |
| 2016/0147545 | A1* | 5/2016 | Jain | G06F 11/3433 713/100 |
| 2016/0164733 | A1* | 6/2016 | Coley | G06F 11/3466 709/221 |
| 2016/0238659 | A1 | 8/2016 | Shiromoto et al. | |
| 2016/0259708 | A1* | 9/2016 | Della Corte | G06F 11/3006 |
| 2016/0291953 | A1* | 10/2016 | Tuzlukov | G06F 8/61 |
| 2016/0328128 | A1* | 11/2016 | Shekh-Yusef | G06F 3/0481 |
| 2017/0046024 | A1* | 2/2017 | Dascola | G06F 3/04886 |
| 2017/0052518 | A1* | 2/2017 | Wang | G05B 11/01 |
| 2017/0063566 | A1* | 3/2017 | Seminario | H04L 67/12 |
| 2017/0118610 | A1* | 4/2017 | Schieman | G06F 21/52 |
| 2017/0118611 | A1* | 4/2017 | Schieman | H04L 43/045 |
| 2017/0155560 | A1* | 6/2017 | Lee | H04L 43/20 |
| 2017/0168472 | A1* | 6/2017 | Ando | G06F 9/44521 |
| 2017/0249232 | A1* | 8/2017 | Matsuki | G06F 11/3419 |
| 2017/0278487 | A1* | 9/2017 | Bae | G05B 19/0423 |
| 2017/0326598 | A1* | 11/2017 | Chelian | A47G 29/16 |
| 2017/0371757 | A1* | 12/2017 | Wang | G06F 11/3452 |
| 2018/0001473 | A1* | 1/2018 | Yoshiuchi | G05B 19/042 |
| 2018/0068550 | A1* | 3/2018 | Ratilla | G08B 21/182 |
| 2018/0091402 | A1* | 3/2018 | Sugimoto | H04L 67/34 |
| 2018/0156859 | A1* | 6/2018 | Takeuchi | G01R 31/30 |
| 2018/0157685 | A1* | 6/2018 | Flerl | G06F 11/3051 |
| 2018/0210803 | A1* | 7/2018 | Kobayashi | G06F 11/3006 |
| 2018/0227165 | A1* | 8/2018 | Philip | H04L 47/748 |
| 2018/0284758 | A1* | 10/2018 | Cella | G05B 19/41845 |
| 2019/0068735 | A1* | 2/2019 | Alcorn | H04L 63/0428 |
| 2019/0121350 | A1* | 4/2019 | Cella | G05B 19/4185 |
| 2019/0129410 | A1* | 5/2019 | Cella | G06Q 30/02 |
| 2019/0188595 | A1* | 6/2019 | Chen | G06N 20/00 |
| 2019/0237997 | A1* | 8/2019 | Tsujii | G05B 19/042 |
| 2020/0371892 | A1* | 11/2020 | Huang | G06F 11/3062 |
| 2021/0157312 | A1* | 5/2021 | Cella | G05B 23/0286 |
| 2021/0216065 | A1* | 7/2021 | Spiro | G06F 16/219 |

FOREIGN PATENT DOCUMENTS

| | | | | |
|---|---|---|---|---|
| EP | 3291036 | A1 * | 3/2018 | G01D 18/00 |
| JP | H06186065 | A | 7/1994 | |
| JP | 2000020124 | A | 1/2000 | |
| JP | 2015082131 | A | 4/2015 | |
| JP | 2016184185 | A * | 10/2016 | C12M 1/00 |
| JP | 2017021545 | A | 1/2017 | |
| WO | WO-2006037137 | A1 * | 4/2006 | B25J 9/1676 |
| WO | 2015/068210 | A1 | 5/2015 | |

OTHER PUBLICATIONS

Office Action dated Feb. 18, 2020, for corresponding JP Patent Application No. 2018-172882 with English translation.

Akihito Kohiga et al. "Applicationresponse time regulation system for auto mobility system" IPSJ SIG Technical Report, vol. 2017-OS-139 No.4, Information Processing Society of Japan, Mar. 1, 2017, pp. 1-13. (See the English translation of the Office Action).

* cited by examiner

FIG.7

| RESOURCE | MONITORING INTERVAL | DISPLAY INTERVAL | APPLICATION TO BE MONITORED | THRESHOLD VALUES | MONITORING RESULT OUTPUT |
|---|---|---|---|---|---|
| CPU | 1 SECOND | 10 SECONDS | ALL APPLICATIONS APPLICATION A APPLICATION B APPLICATION C APPLICATION D APPLICATION E | WARNING 80% ERROR 90% | YES |
| RAM | 5 SECONDS | 30 SECONDS | ALL APPLICATIONS APPLICATION A APPLICATION B APPLICATION C | WARNING 75% ERROR 85% | YES |
| HARD DISK | 30 SECONDS | 5 MINUTES | ALL APPLICATIONS APPLICATION A APPLICATION B APPLICATION C APPLICATION E | WARNING 90% ERROR 95% | YES |

| RESOURCE | LOG FILE | DATE/TIME |
|---|---|---|
| CPU | FILE 1-1 | 2018/9/4 00:00 - 2018/9/4 23:59 |
| | FILE 1-2 | 2018/9/5 00:00 - 2018/9/5 23:59 |
| | ⋮ | ⋮ |
| RAM | FILE 2-1 | 2018/9/4 00:00 - 2018/9/4 23:59 |
| | FILE 2-2 | 2018/9/5 00:00 - 2018/9/5 23:59 |
| | ⋮ | ⋮ |
| HARD DISK | FILE 3-1 | 2018/9/4 00:00 - 2018/9/4 23:59 |
| | FILE 3-2 | 2018/9/5 00:00 - 2018/9/5 23:59 |
| | ⋮ | ⋮ |

| STATE OF RESOURCE | ERROR | WARNING | NORMAL |
|---|---|---|---|
| CRITICAL | 1 | 2 | 3 |
| WARNING | 2 | 1 | 3 |
| NORMAL | 3 | 2 | 1 |
| ⋮ | ⋮ | ⋮ | ⋮ |

RESOURCE MONITORING SYSTEM, RESOURCE MONITORING METHOD, AND INFORMATION STORAGE MEDIUM

CROSS-REFERENCE TO RELATED APPLICATION

The present disclosure contains subject matter related to that disclosed in Japanese Patent Application JP2018-172882 filed in the Japan Patent Office on Sep. 14, 2018 the entire contents of which are hereby incorporated by reference.

BACKGROUND OF THE INVENTION

1. Field of the Invention

The embodiments disclosed herein relate to a resource monitoring system, a resource monitoring method, and an information storage medium.

2. Description of the Related Art

In WO 2015/068210 A1, there is described a system in which an application for uploading trace data on an industrial device to a cloud server is executed by a computer, and the trace data uploaded to the cloud server is analyzed by an analyst.

SUMMARY OF THE INVENTION

According to at least one embodiment of the present invention, there is provided a resource monitoring system including: a computer configured to execute an application for analyzing an operation of an industrial device and circuitry configured to: acquire a use status of a resource of the computer by the application; and display the use status on a resource monitoring screen.

BRIEF DESCRIPTION OF THE DRAWINGS

FIG. 7 is a table for showing a data storage example of a setting database.

FIG. 8 is a table for showing a data storage example of a log file database.

FIG. 9 is a table for showing an example of an abnormality detection condition.

DESCRIPTION OF THE EMBODIMENTS

1. Overall Configuration of Resource Monitoring System

From a viewpoint of an inventor of the present invention, when an application for analyzing an operation of an industrial device is executed by a computer, and resources of the computer are excessively used, a problem may occur in the operation analysis by the application or other processing executed by the computer. Therefore, the inventor of the present invention diligently has conducted research and development to allow the application for analyzing the operation of the industrial device to appropriately use the resources of the computer, and has consequently arrived at a novel and original resource monitoring system and the like. A detailed description is now given of the resource monitoring system and the like according to at least one embodiment.

Figure 1:
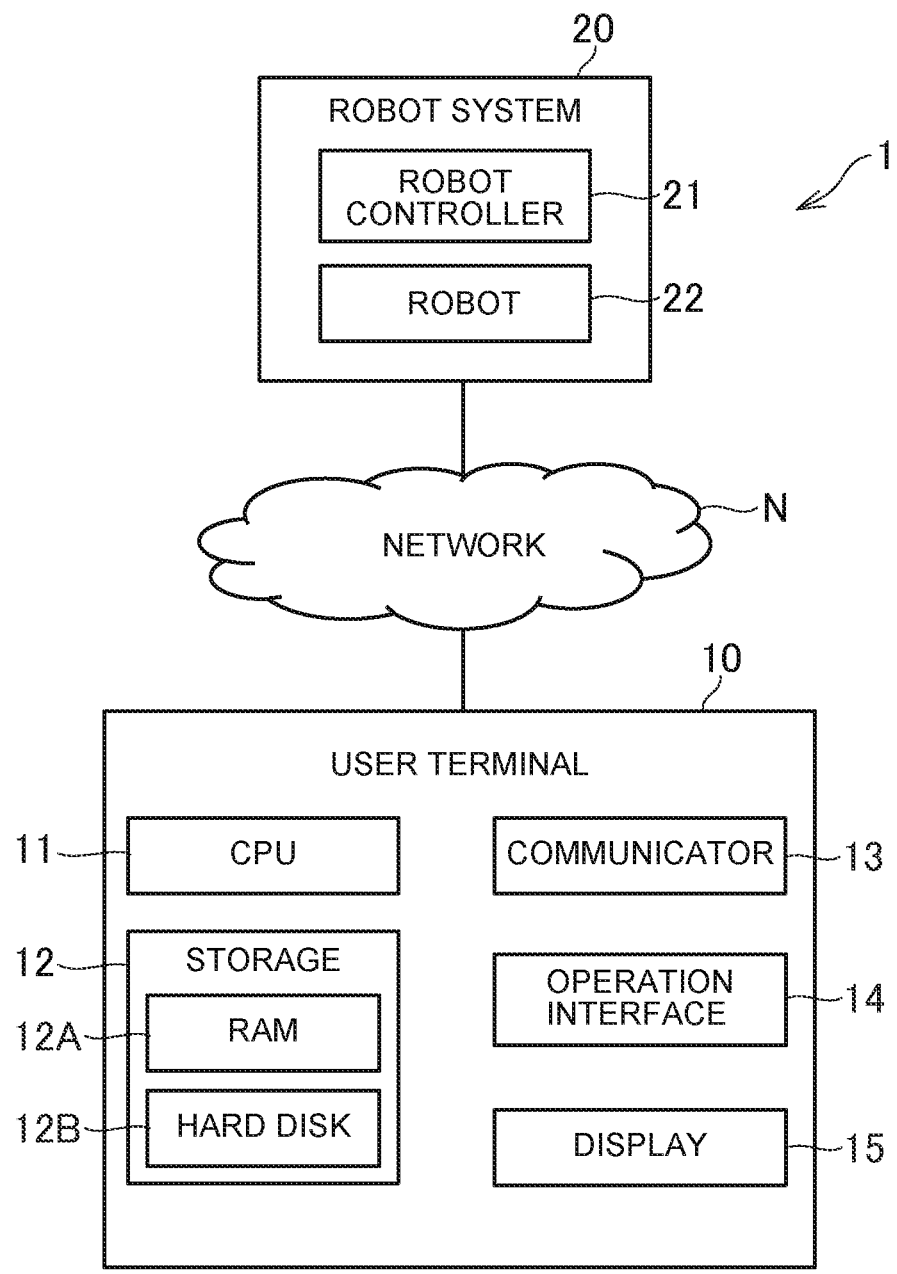
FIG. 1 is a diagram for illustrating an overall configuration of a resource monitoring system according to at least one embodiment of the present invention.

FIG. 1 is a diagram for illustrating an overall configuration of the resource monitoring system according to at least one embodiment. As illustrated in FIG. 1, the resource monitoring system 1 includes a user terminal 10 and a robot system 20. Each of the user terminal 10 and the robot system 20 is connected to a network N, such as the Internet or a local area network. In FIG. 1, one user terminal 10 and one robot system 20 are illustrated, but there may be a plurality of user terminals 10 and robot systems 20.

The user terminal 10 is a computer to be operated by a user. The user may be a maintenance person of the robot system 20, or may be an administrator of the resource monitoring system 1. For example, the user terminal 10 is a personal computer, a cellular phone (including a smartphone), or a mobile terminal (including a tablet terminal). The user terminal 10 includes a CPU 11, a storage 12, a communicator 13, an operation interface 14, and a display 15.

The CPU 11 includes at least one processor. The storage 12 includes a RAM 12A and a hard disk 12B, and is configured to store various programs and data. The CPU 11 is configured to execute various types of processing based on those programs and data. The RAM 12A is an example of a volatile memory. The hard disk 12B is an example of a nonvolatile memory. The hard disk 12B may not be a built-in hard disk, but may be an external hard disk. The communicator 13 includes a communication interface, such as a network card and various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The programs and data described as being stored in the storage 12 may be supplied to the user terminal 10 through the network N. Moreover, the hardware configuration of the user terminal 10 is not limited to the above-mentioned example, and various types of hardware can be applied. For example, the user terminal 10 may include a reader (for example, an optical disc drive and a memory card slot) configured to read a computer-readable information storage medium, and an input/output device (for example, a USB terminal) configured to directly connect to an external device. In this case, programs and data stored in the information storage medium may be supplied to the user terminal 10 through the reader or the input/output device.

The robot system 20 includes a robot controller 21 and a robot 22. In FIG. 1, one robot controller 21 and one robot 22 are illustrated, but there may be a plurality of robot controllers 21 and robots 22. For example, a plurality of robot controllers 21 may be included in the robot system 20, or one robot controller 21 may control a plurality of robots 22.

The robot controller 21 is a computer configured to control the robot 22. The robot controller 21 may be a dedicated device specialized in a specific robot 22, but is a general computer in at least one embodiment. The robot controller 21 has hardware such as a CPU, a RAM, a hard disk, and a communication interface, and is configured to transmit an operation instruction to the robot 22. The robot controller 21 may control a plurality of robots 22.

The robot 22 is an industrial robot. The robot 22 may be a general-purpose articulated robot. For example, various types of robots such as a vertical articulated robot, a horizontal articulated robot, and a gantry robot can be applied. There may be any number of arms of the robot 22. There may be only one arm or a plurality of arms.

The robot 22 is an example of the industrial device. Therefore, in at least one embodiment, a part described as "robot 22" can be replaced by "industrial device". An industrial device of any type can be applied to the resource monitoring system 1. The industrial device may be a motor controller, a servomotor, an inverter, a machine tool, or a programmable logic controller (PLC). The operation of such industrial devices may be analyzed in the resource monitoring system 1.

2. Overview of Resource Monitoring System

The user terminal 10 executes an application for analyzing an operation of the robot 22. In at least one embodiment, a description is given of a case in which the user terminal 10 executes each of a plurality of applications, but the user terminal 10 may execute only one application.

The application acquires operation data measured by the robot 22 to analyze the operation data. The operation data is only required to be data indicating the operation of the robot 22. Various types of information such as a torque signal, temperature information, a speed feedback value, an external force value, or a feedback pulse signal may be indicated by the operation data. The application is only required to correspond to the type of the robot 22 or an object of the analysis, and may be, for example, a standard application for operating the resource monitoring system 1 or an application for executing specific operation analysis. Those applications may be produced by a manufacturer, or a user may produce those applications, and install the applications in the user terminal 10 as an add-on program.

The standard application may be web server software for operating the resource monitoring system 1 or an executable application written in a program language, for example, the C language. The program language is not limited to the C language, and any language is applicable. The application for executing the specific operation analysis is an application produced so as to analyze a specific operation of the robot 22. It is possible to apply various applications such as an application for collecting the operation data on the robot 22 to store the operation data in the hard disk 12B, an application for predicting a failure in a speed reducer of the robot 22, an application for detecting a sputter scattered when the robot 22 executes gas welding or arc welding, and an application for monitoring spot welding by the robot 22.

The user terminal 10 executes various applications, and hence, when a specific application excessively uses a resource, a problem may occur in execution of other applications. Moreover, when the user terminal 10 is used for other purposes such as parameter adjustment, and maintenance and inspection for the robot controller 21 and the robot 22, a problem may also occur in the use for those purposes. Thus, in at least one embodiment, the user terminal 10 displays a resource monitoring screen on the display 15, to thereby allow the user to monitor the use status of resources by the application.

The use status of the resource is a use status of a hardware resource. A use status of each of the CPU 11, the RAM 12A, and the hard disk 12B is exemplified in at least one embodiment. The use status of the CPU 11 is a usage rate of the CPU 11. The use status of the RAM 12A is a usage rate of the RAM 12A. The use status of the hard disk 12B is a usage rate of the hard disk 12B. The resources to be monitored are not limited thereto, and any type of resource may be set as the resource to be monitored. For example, a use status of the network N by the user terminal 10, a use status of a memory such as an EEPROM or a flash memory, or a use status of a battery of the user terminal 10 may be set as the resources to be monitored.

Figure 2:
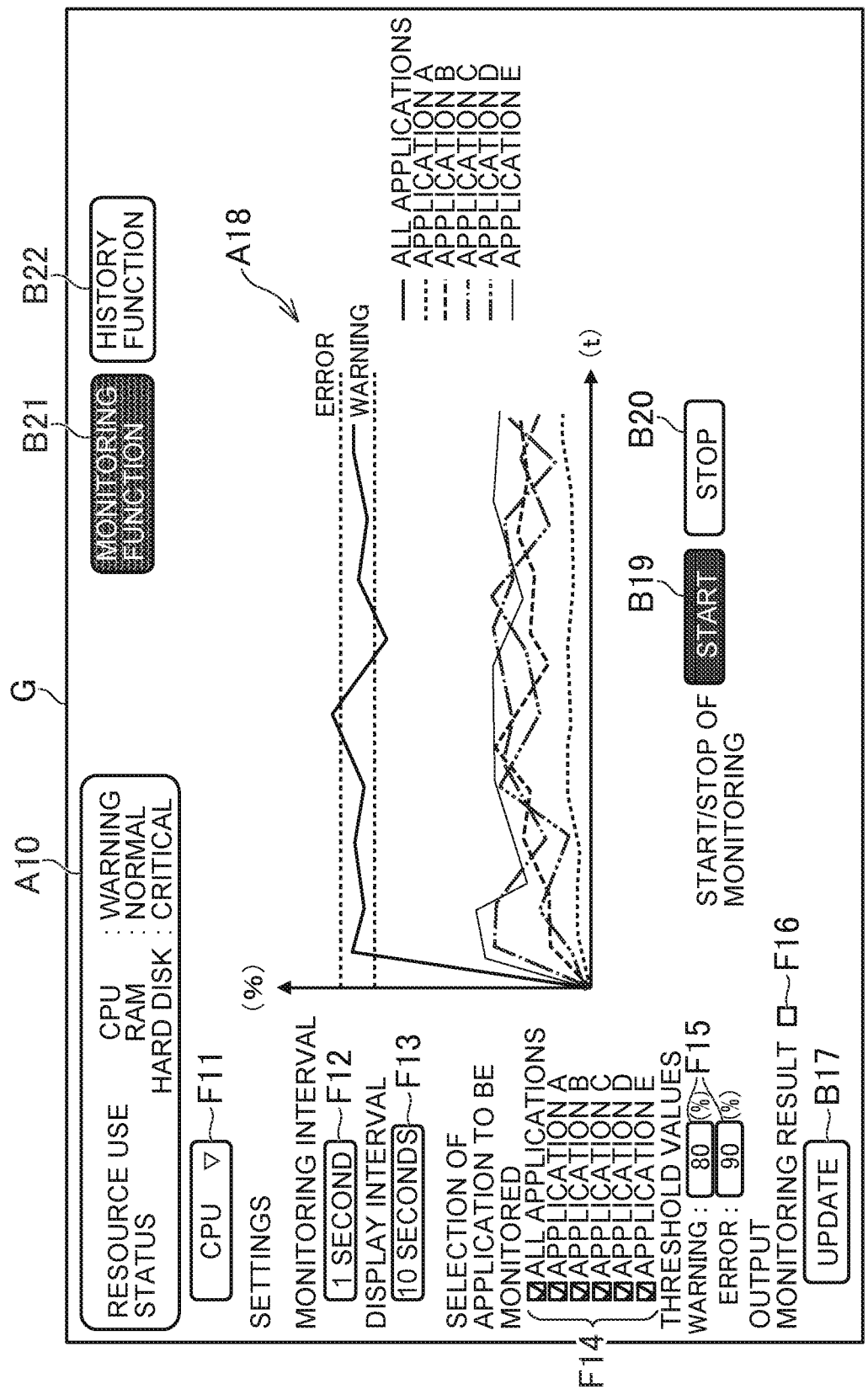
FIG. 2 is a diagram for illustrating an example of a resource monitoring screen.

FIG. 2 is a diagram for illustrating an example of the resource monitoring screen. As illustrated in FIG. 2, use statuses of the resources by all of running programs are not displayed on the resource monitoring screen G, but instead, the resource monitoring screen G is a screen specialized in applications for analyzing the operation of the robot 22, which is different from a task manager of a general OS or the like. The resource monitoring screen G may be displayed on a browser of the user terminal 10, or may be displayed as a screen of a dedicated program for the resource monitoring.

Current states of the respective resources are displayed in a display area A10 of the resource monitoring screen G. For example, information indicating whether or not abnormality is occurring is displayed in the display area A10. In at least one embodiment, the current state of each of the resources is classified into any one of "NORMAL" indicating that the use status is in a normal range, "WARNING" indicating that some abnormality is occurring in the use status, and "CRITICAL" indicating that serious abnormality is occurring in the use status.

An input form F11 for selecting a resource to be monitored is displayed on the resource monitoring screen G. The resource to be monitored is a type of resource whose use status is to be displayed in a display area A18 described later. In at least one embodiment, the three types of resources of the CPU 11, the RAM 12A, and the hard disk 12B exist, and hence the user selects any one of the three types of resources from the input form F11. In the resource monitoring screen G of FIG. 2, a state in which the CPU 11 is selected is shown.

An input form F12 for inputting a monitoring interval and an input form F13 for inputting a display interval are displayed on the resource monitoring screen G. The monitoring interval is a time interval for monitoring the use status of the resource. The user terminal 10 acquires the use status of the resource at the monitoring intervals. The display interval is an interval of displaying the use status of the resource on the resource monitoring screen G, and is a scale of a graph in the display region A18 described later.

An input form F14 for selecting an application to be monitored is displayed on the resource monitoring screen G. The application to be monitored is a type of application whose resource use status is to be displayed in the display area A18 described later. The user can select a part or all of the applications executed by the user terminal 10 as the applications to be monitored.

As illustrated in FIG. 2, a list of the applications installed in the user terminal 10 is displayed next to the input form F14. In the example of FIG. 2, the user terminal 10 is executing applications A to E. Names of those applications are displayed next to the input form F14. Moreover, in at least one embodiment, a use status of all of the applications can be displayed, and the input form F14 for displaying the total use status is displayed.

The user turns on a checkbox in the input form F14, to thereby select an application to be monitored. An application whose checkbox is turned off is removed from the application to be monitored, and the use status of the resource by this application is not displayed on the resource monitoring screen G. In this case, the use status of the resource by the application whose checkbox is turned off may not be acquired, or the use status of the resource may be acquired but the use status may not be displayed.

An input form F15 for setting threshold values for detecting abnormality of the use status of the resource is displayed on the resource monitoring screen G. In at least one embodiment, a description is given of a case in which threshold values for two levels of "Warning" and "Error" are set. However, the threshold value may have one level or three or more levels.

"Warning" is lower in severity than "Error", and the threshold value for "Warning" is thus less than the threshold value for "Error". Moreover, although described in detail later, the state of each resource in the display area A10 is determined based on a ratio of a period in which the use status is not "Warning" or "Error", a ratio of a period in which the use status is "Warning", and a ratio of a period in which the use status is "Error".

An input form F16 for outputting a monitoring result as a file is displayed on the resource monitoring screen G. When the user turns on a checkbox of the input form F16, a log file in which the monitoring result of the use status of the resource is stored is output. When the checkbox of the input form F16 is not turned on by the user, the monitoring result is not output as a log file, and is temporarily recorded in the storage 12. In at least one embodiment, it is assumed that the use status at every display interval input to the input form F13 is stored in the log file, but the use status at any interval may be stored.

A button B17 for reflecting the setting input to each of the input forms F12 to F16 is displayed on the resource monitoring screen G. When the user selects the button B17, the settings for the resource to be monitored are updated.

The use statuses of the resource to be monitored are displayed in the display area A18 of the resource monitoring screen G. In at least one embodiment, a description is given of a case in which the use statuses of the resource are displayed as time series through use of a graph, but the use statuses of the resource may be displayed in any form, and the display form is not limited to the graph. For example, the use statuses of the resource may be displayed in a tabular form or a list form, or only numerical values indicating the use statuses of the resource may simply be displayed.

In the example of FIG. 2, five types of applications are selected as the applications to be monitored, and a use status for all of those applications is also selected. Thus, the use status of each of the five types of applications and the use status of all the applications are displayed in the display area A18. A vertical axis of the graph indicates the usage rate of the CPU 11, and a horizontal axis is a time axis. The scale of the time axis is determined based on the display interval input to the input form F13.

A button B19 for starting the resource monitoring function and a button B20 for stopping the resource monitoring function are displayed on the resource monitoring screen G. The use statuses of the resource are acquired at any time while the resource monitoring function is active, and the graph in the display area A18 is updated in real time. When the resource monitoring function is stopped, the acquisition of the use statuses of the resource is stopped, and the graph in the display area A18 is fixed. In the example of FIG. 2, an example in which the button B19 is selected and the resource monitoring function is active is illustrated. When the button B20 is selected, the resource monitoring function is stopped.

A button B21 for displaying the current use statuses and a button B22 for displaying past use statuses are displayed on the resource monitoring screen G. In the example of FIG. 2, the button B21 is selected, and the current use statuses are displayed in real time on the resource monitoring screen G. When the button B22 is selected, the resource monitoring screen G is switched, and the past use statuses are displayed based on the log file.

Figure 3:
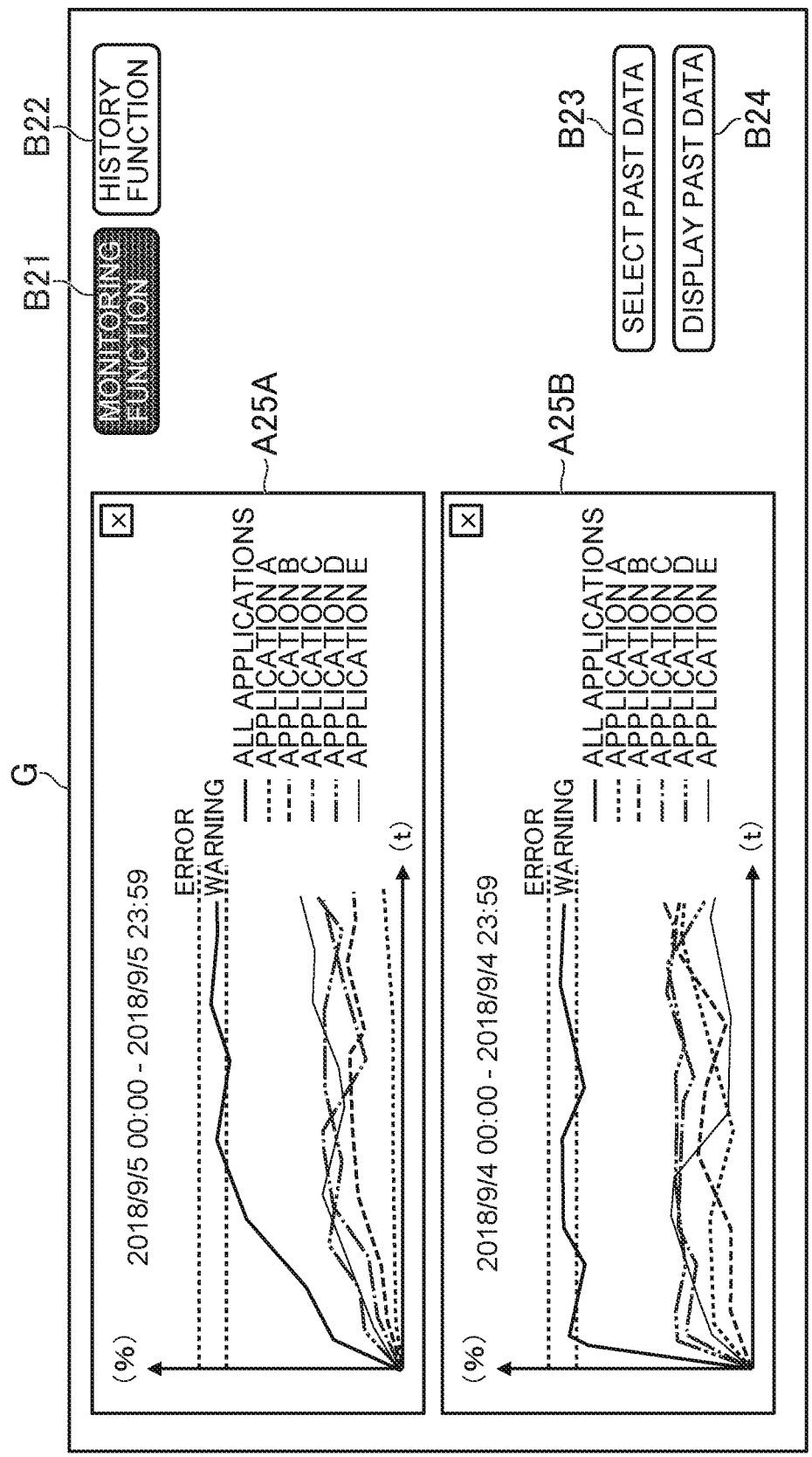
FIG. 3 is a diagram for illustrating how past use statuses are displayed on the resource monitoring screen.

FIG. 3 is a diagram for illustrating how past use statuses are displayed on the resource monitoring screen G. As illustrated in FIG. 3, the buttons B21 and B22 are displayed on the resource monitoring screen G, and the button B22 is selected in this case. When the button B21 is selected, the resource monitoring screen G returns to the state of FIG. 2.

A button B23 for selecting a log file and a button B24 for displaying the selected log file are displayed on the resource monitoring screen G. The user selects the button B23, and inputs a storage location (reference destination) of a log file that the user desires to be displayed. Then, when the user inputs the storage location of the log file and selects the button B24, the log file is displayed in a display area A25 of the resource monitoring screen G.

Two log files are displayed in the example of FIG. 3. For example, details of a first log file are displayed in a display area A25A. Details of a second log file are displayed in the display area A25B. For example, when the first log file is output before add-on of a specific application and the second log file is output after the add-on of the specific application, changes in the use statuses of the resource before and after the add-on can be displayed.

The case in which the use statuses of the CPU 11 are displayed is illustrated in FIG. 2 and FIG. 3, and the use statuses of the RAM 12A and the hard disk 12B can also be displayed in a similar manner. For example, when the user selects the RAM 12A from the input form F11 of the resource monitoring screen G, the display changes to the use statuses of the RAM 12A. When the user selects the hard disk 12B from the input form F11 of the resource monitoring screen G, the display changes to the use statuses of the hard disk 12B.

Figure 4:
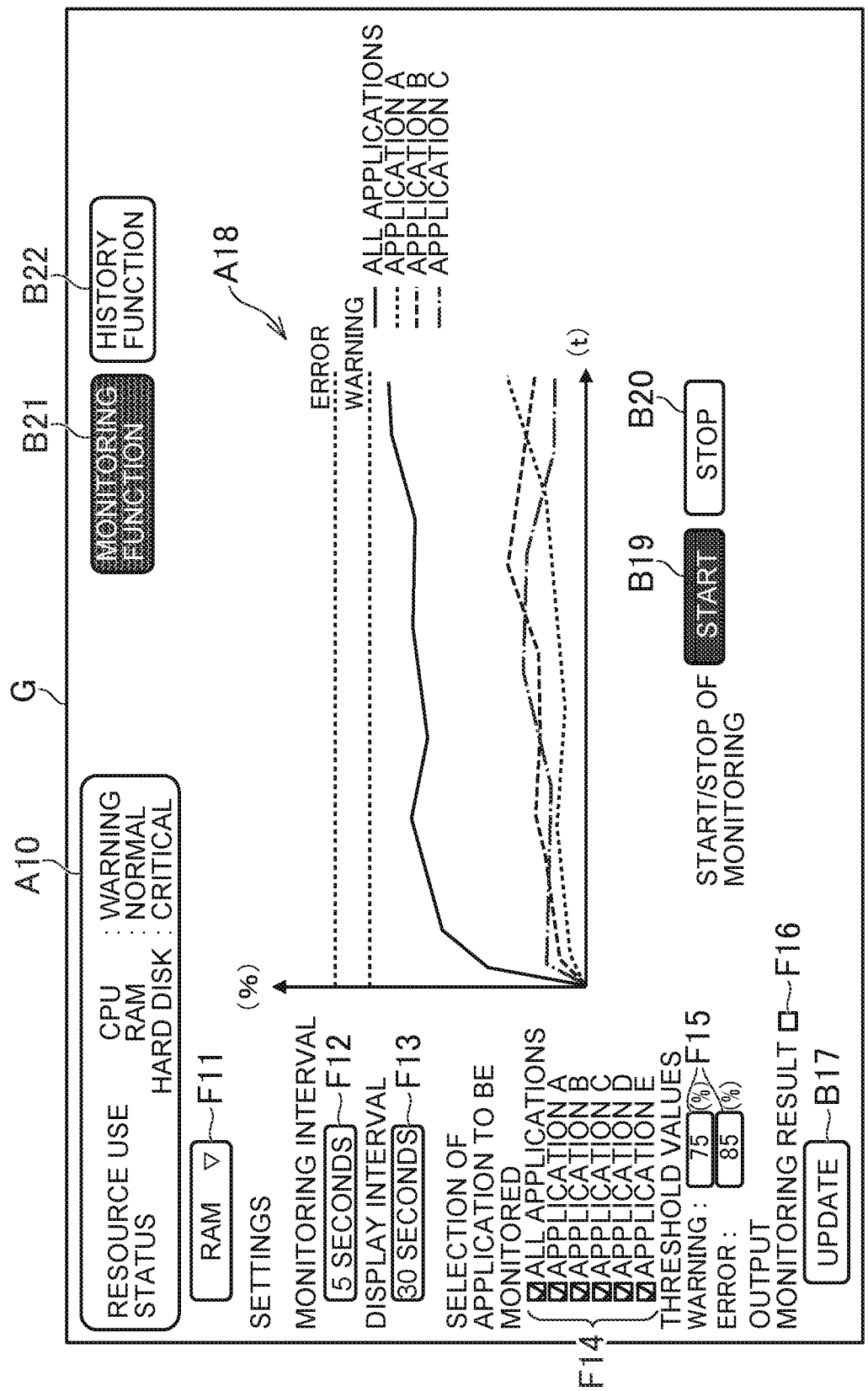
FIG. 4 is a diagram for illustrating how use statuses of a RAM are displayed.
Figure 5:
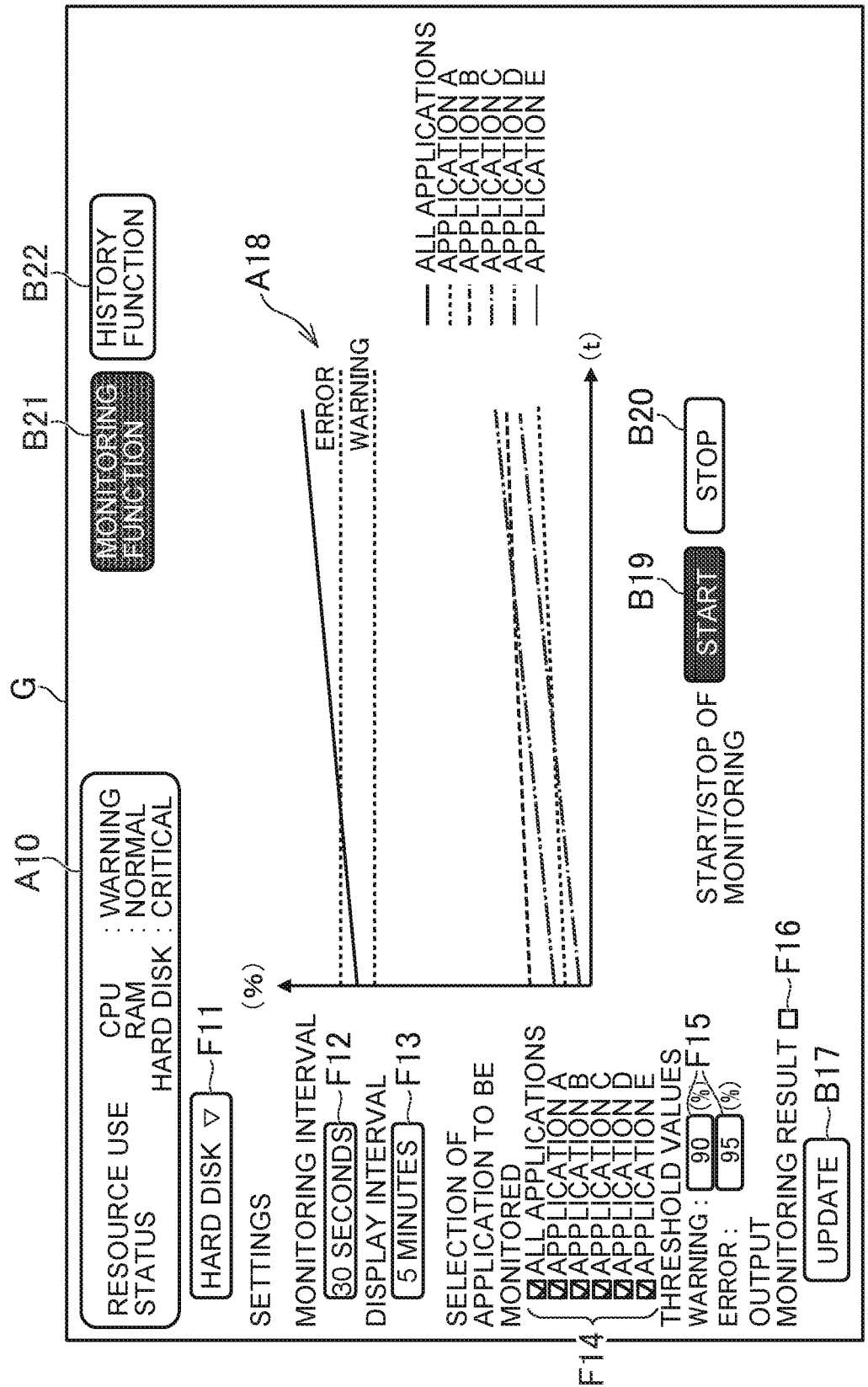
FIG. 5 is a diagram for illustrating how use statuses of a hard disk are displayed.

FIG. 4 is a diagram for illustrating how the use statuses of the RAM 12A are displayed. FIG. 5 is a diagram for illustrating how the use statuses of the hard disk 12B are displayed. As illustrated in FIG. 4, the use statuses of the RAM 12A are displayed on the resource monitoring screen G based on the settings input by the user to the input forms F12 to F16. Moreover, as illustrated in FIG. 5, the use statuses of the hard disk 12B are displayed on the resource monitoring screen G based on the settings input by the user to the input forms F12 to F16. The settings may be common to all the resources, but the settings are made to each of the resources in at least one embodiment. Therefore, the monitoring interval and the display interval may be different between the CPU 11 and the RAM 12A. Moreover, the applications to be monitored may be different between the CPU 11 and the hard disk 12B.

The setting items, such as the monitoring interval and the display interval, are the same among the resources in at least one embodiment in order to simplify the description, but a setting item corresponding to each resource may exist. For example, when the RAM 12 includes a plurality of memories, a type of memory whose use status is to be displayed may exist as the setting item. Moreover, for example, when the hard disk 12B includes a plurality of storages, a storage whose use status is to be displayed may exist as the setting item.

As described above, the resource monitoring system 1 is configured to display the resource monitoring screen G on the display 15, to thereby allow the applications for analyzing the operation of the industrial device to appropriately use the resources of the computer. A detailed description is now given of this configuration.

3. Functions to be Implemented by Resource Monitoring System

Figure 6:
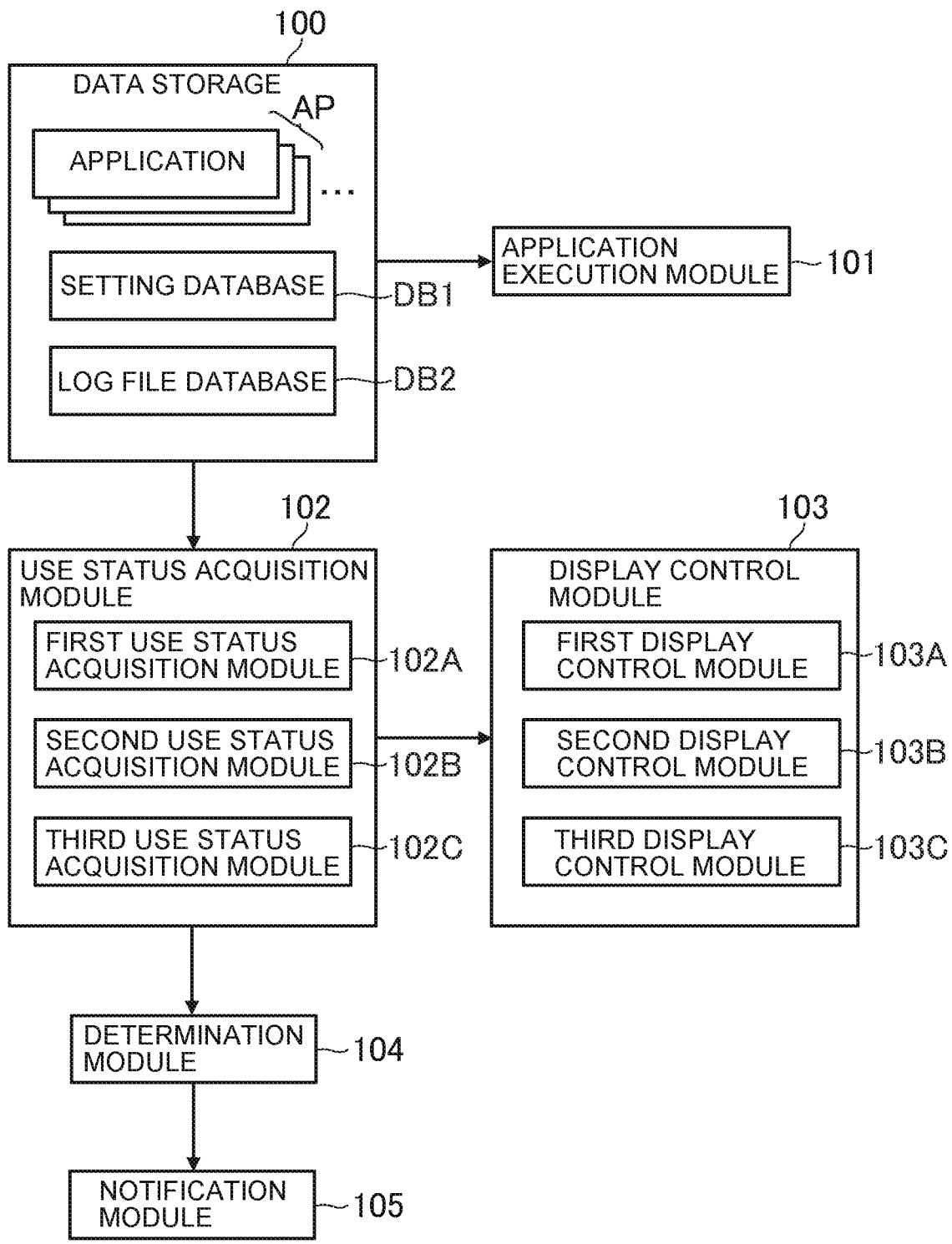
FIG. 6 is a functional block diagram for illustrating functions to be implemented in the resource monitoring system.

FIG. 6 is a functional block diagram for illustrating functions implemented in the resource monitoring system 1. As illustrated in FIG. 6, a data storage 100, an application execution module 101, a use status acquisition module 102, a display control module 103, a determination module 104, a notification module 105, and a cycle acquisition module 106 are implemented in the resource monitoring system 1. In at least one embodiment, a description is given of a case in which each of those functions is implemented in the user terminal 10.

[Data Storage]

The data storage 100 is mainly implemented by the storage 12. The data storage 100 is configured to store data required to display the use statuses of the resources. For example, the data storage 100 stores applications AP to be executed by the user terminal 10. For example, collection conditions for the operation data to be collected from the robot 22 may be set to each of the applications AP, and the data storage 100 may store the collection condition specified by the user. For example, conditions such as a type, a collection interval, and a collection time period of the operation data to be collected are set as the collection conditions.

Moreover, for example, the data storage 100 includes a setting database DB1 and a log file database DB2.

FIG. 7 is a table for showing a data storage example of the setting database DB1. As shown in FIG. 7, the setting database DB1 is a database for storing setting values input on the resource monitoring screen G. In at least one embodiment, the three types of resources of the CPU 11, the RAM 12A, and the hard disk 12B exist and the setting values can be input for each of the resources, and hence the setting values for each of the resources are stored in the setting database DB1. The monitoring interval input to the input form F12, the display interval input to the input form F13, the types of the applications AS to be monitored input to the input form F14, the threshold values input to the input form F15, and whether or not to output the log file input to the input form F16 are stored as the setting values in the setting database DB1.

FIG. 8 is a table for showing a data storage example of the log file database DB2. As shown in FIG. 8, the log filed database DB2 is a database for storing the log files. In at least one embodiment, the three types of resources of the CPU 11, the RAM 12A, and the hard disk 12B exist and whether or not to output the log file can be set for each of the resources, and hence log files of the resources whose log file is set to be output and a date and time of each of the log files are stored in the log file database DB2. The date and time of the log file are a date and time at which the use status stored in the log file is acquired.

The data stored in the data storage 100 is not limited to the above-mentioned example. For example, the data storage 100 may store application list data indicating a list of the applications AP. The application list data is updated each time the add-on of an application AP occurs. Moreover, for example, the data storage 100 may store the operation data on the robot 22 collected by each of the applications AP. Moreover, for example, the data storage 100 may store an abnormality detection condition described later.

[Application Execution Module]

The application execution module 101 is implemented mainly by the CPU 11. The application execution module 101 is configured to execute the application AP. In at least one embodiment, a plurality of applications AP are stored in the data storage 100, and the application execution module 101 thus executes each of the plurality of applications AP. For example, the application execution module 101 executes the application AP, to thereby collect the operation data from the robot system 20 based on the collection condition set to this application AP.

Moreover, for example, the application execution module 101 executes the application to analyze the collected operation data. It is assumed that an analysis method for the operation data is described in an algorithm contained in the application AP. For example, when an application AP collects the application data on the robot 22 to accumulate the operation data in the hard disk 12B, the application execution module 101 accumulates the operation data collected based on the collection condition in the operation database. Moreover, for example, when an application AP predicts a failure in a speed reducer of the robot 22, the application execution module 101 determines whether or not the operation data on the speed reducer satisfies a predetermined condition, and issues a notification that a failure may exist when the predetermined condition is satisfied.

Moreover, for example, when an application AP detects spatter scattered when the robot 22 conducts gas welding or arc welding, the application execution module 101 determines whether or not the spatter is detected based on the operation data acquired from the robot 22, and displays a determination result on the display 15. Moreover, for example, when an application AP monitors spot welding by the robot 22, the application execution module 101 determines whether or not abnormality is occurring in the spot welding based on an image taken by a camera on a site in which the robot 22 is installed or a temperature detected by a temperature sensor, and displays a determination result on the display 15.

[Use Status Acquisition Module]

The use status acquisition module 102 is mainly implemented by the CPU 11. The use status acquisition module 102 is configured to acquire the use status of the resource of the computer by the application AP. The use status acquisition module 102 acquires the use status of a resource to be monitored based on an acquisition method corresponding to the resource. In at least one embodiment, the monitoring interval for the resource is set, and hence the use status acquisition module 102 acquires the use status of the resource based on the monitoring interval stored in the setting database DB1. The use status acquisition module 102 acquires the use status of the resource at the monitoring intervals. That is, the use status acquisition module 102 determines whether or not a period indicated by the monitoring interval has elapsed, and acquires the use status of the resource when the situation acquisition module 102 determines that the period has elapsed.

Various methods can be applied as the acquisition method itself for the use status. For example, the use status acquisition module 102 executes a predetermined command defined in the OS, to thereby acquire the use status. For example, the use status acquisition module 102 executes the top command or the typeperf command to acquire the use status of the CPU 11. Moreover, for example, the use status acquisition module 102 executes the top command or the tasklist command to acquire the use status of the RAM 12A. Further, for example, the use status acquisition module 102 executes the df command or the dir command to acquire the use status of the hard disk 12B.

In at least one embodiment, the use status acquisition module 102 includes a first use status acquisition module 102A, a second use status acquisition module 102B, and a third use status acquisition module 102C.

The first use status acquisition module 102A is configured to acquire the use status for each of the applications AP. The first use status acquisition module 102A acquires the use status for each of the plurality of applications AP. In at least one embodiment, the user can select any application AP as the application to be monitored, and the first use status acquisition module 102A acquires the use status for the application AP specified as the application to be monitored by the user.

The second use status acquisition module 102B acquires a total use status, which is a sum of the use statuses of the respective applications AP. The total use status may be a sum of the use statuses of all of the applications AP being executed by the application execution module 101, or a sum of the use statuses of the applications AP specified as the applications to be monitored. For example, the second use status acquisition module 102B sums the use statuses of the respective applications AP acquired by the first use status acquisition module 102A, to thereby acquire the total use status. Moreover, for example, the second use status acquisition module 102B may execute a command to acquire the overall use status without acquiring the use statuses of the respective applications AP, to thereby acquire the total use status.

The third use status acquisition module 102C acquires a change in the use status before and after the application AP is added to the user terminal 10. In at least one embodiment, the use status before and after the add-on of the application AP is stored in the log file, and hence the third use status acquisition module 102C refers to the log file database DB2 to acquire the use status before the add-on and the use status after the add-on, to thereby acquire the change in the use status before and after the add-on. Not the log file, but the use status at the current time point may be used as the use status after the add-on.

[Display Control Module]

The display control module 103 is mainly implemented by the CPU 11. The display control module 103 displays the use statuses on the resource monitoring screen G. The display control module 103 displays the use statuses acquired by the use status acquisition module 102 on the resource monitoring screen G. In at least one embodiment, a description is given of the case in which the display control module 103 displays the graph in the display area A18 to display the use statuses, but the use statuses may be displayed in a tabular form, a list form, or other forms as described above. In at least one embodiment, the display interval for the use status is set, and hence the use status acquisition module 102 displays the use statuses of the resource based on the display interval stored in the setting database DB1. The use status acquisition module 102 displays the use statuses of the resource at the display intervals. That is, the use status acquisition module 102 sets a unit of display of the use statuses of the resource to the display interval set for this resource.

In at least one embodiment, the display control module 103 includes a first display control module 103A, a second display control module 103B, and a third display control module 103C.

The first display control module 103A is configured to display the use status of each application AP on the resource monitoring screen G. The first display control module 103A displays the use status of each of the plurality of applications AP on the resource monitoring screen G. In at least one embodiment, the user can select any application AP as the application to be monitored, and the first display control module 103A thus displays the use statuses of the application AP specified as the application to be monitored by the user on the resource monitoring screen G. For example, the first display control module 103A displays in the display area A18 a graph indicating the use status of the application AP specified as the application to be monitored by the user.

The second display control module 103B is configured to display the total use status on the resource monitoring screen G. In at least one embodiment, a description is given of the case in which the second display control module 103B displays the total use status as well as the use statuses of the respective applications AP on the resource monitoring screen G, but the total use status may be displayed on the resource monitoring screen G separately from the use statuses of the respective applications AP. For example, the second display control module 103B displays in the display area A18 a graph indicating the total use status.

The third display control module 103C is configured to display a change in the use status on the resource monitoring screen G. In at least one embodiment, a description is given of a case in which the third display control module 103C displays each of the use status before the add-on and the use status after the add-on on the resource monitoring screen G, but the third display control module 103C may display information on the change in the use status before and after the add-on (for example, an increase amount of the use status before and after the add-on) on the resource monitoring screen G. For example, as illustrated in FIG. 3, the third display control module 103C displays on the resource monitoring screen G the use status indicated by the log file before the add-on and the use status indicated by the log file after the add-on.

[Determination Module]

The determination module 104 is implemented mainly by the CPU 11. The determination module 104 is configured to determine whether or not the use status satisfies a predetermined abnormality detection condition. The abnormality detection condition is a condition defined so as to detect abnormality in the use status. For example, the abnormality detection condition is such a condition that the use status becomes equal to or more than the threshold value, such a condition that a state in which the use status is equal to or more than the threshold continues for a certain period or longer, or such a condition that a frequency of the state in which the use status becomes equal to or more than the threshold value becomes equal to or higher than a predetermined frequency.

In at least one embodiment, as an example of the abnormality detection condition, a description is given of such a condition that a ratio of a period in which the use status is equal to or more than the threshold value to a certain period is a predetermined ratio. This certain period may by a fixed value or a variable value. In at least one embodiment, the ratio is a ratio to the display interval input in the input form F13, but the ratio may be a ratio to a control cycle of the robot 22 as in a modification example of the present invention described later. It is assumed that the abnormality detection condition is stored in the data storage 100.

FIG. 9 is a table for showing an example of the abnormality detection condition. As shown in FIG. 9, the abnormality detection condition is a condition relating to ratios of periods in which the state is one of "Error", "Warning", and "Normal". "Error" is a state in which the use status is equal to or more than a threshold value of "Error". "Warning" is a state in which the use status is less than the threshold value of "Error", and is equal to or more than a threshold value of "Warning". "Normal" is a state in which the use status is less than the threshold value of "Warning". Numerical values shown in the table of FIG. 9 indicate orders in length of the respective periods.

For example, when "Error" is first, "Warning" is second, and "Normal" is third in the order, the determination module 104 determines that the state of the resource is "CRITICAL". Moreover, for example, when "Error" is second, "Warning" is first, and "Normal" is third in the order, the determination module 104 determines that the state of the resource is "WARNING". Further, for example, when "Error" is third, "Warning" is second, and "Normal" is first in the order, the determination module 104 determines that the state of the resource is "NORMAL".

In at least one embodiment, a plurality of types of resources are set as resources to be monitored, and hence the determination module 104 determines whether or not the abnormality detection condition is satisfied for each of the resources. For example, the determination module 104 determines whether or not the abnormality detection condition is satisfied based on the use status of the CPU 11. Moreover, for example, the determination module 104 determines whether or not the abnormality detection condition is satisfied based on the use status of the RAM 12A. Further, for example, the determination module 104 determines whether or not the abnormality detection condition is satisfied based on the use status of the hard disk 12B. The abnormality detection condition may be common to all the resources, or an abnormality detection condition may be defined in association with each of the resources.

[Notification Module]

The notification module 105 is mainly implemented by the CPU 11. The notification module 105 is configured to issue predetermined abnormality notification when the abnormality detection condition is satisfied. The abnormality notification is only required to be a predetermined notification indicating that the abnormality detection condition is satisfied. For example, the abnormality notification is display of a predetermined image, output of a predetermined sound from a speaker or the like, light emission from a light emitter, for example, an LED light, or a vibration of a vibrator of the user terminal 10.

In at least one embodiment, the notification module 105 uses the state displayed in the display area A10 of the resource monitoring screen G to issue the abnormality notification. In the case of the abnormality detection condition of FIG. 9, the determination module 104 returns a determination result that is any one of "CRITICAL", "WARNING", and "NORMAL", and hence the notification module 105 displays the determination result obtained by the determination module 104 in the display area A10.

Moreover, in at least one embodiment, the plurality of types of resource are set as resources to be monitored, and the notification module 105 notifies the determination result obtained by the determination module 104 for each of the resources. For example, the determination module 104 displays the determination result of the use status of the CPU 11 in the display area A10. Moreover, for example, the determination module 104 displays the determination result of the use status of the RAM 12A in the display area A10. Further, for example, the determination module 104 displays the determination result of the use status of the hard disk 12B in the display area A10.

4. Processing to be Executed by Resource Monitoring System

Figure 10:
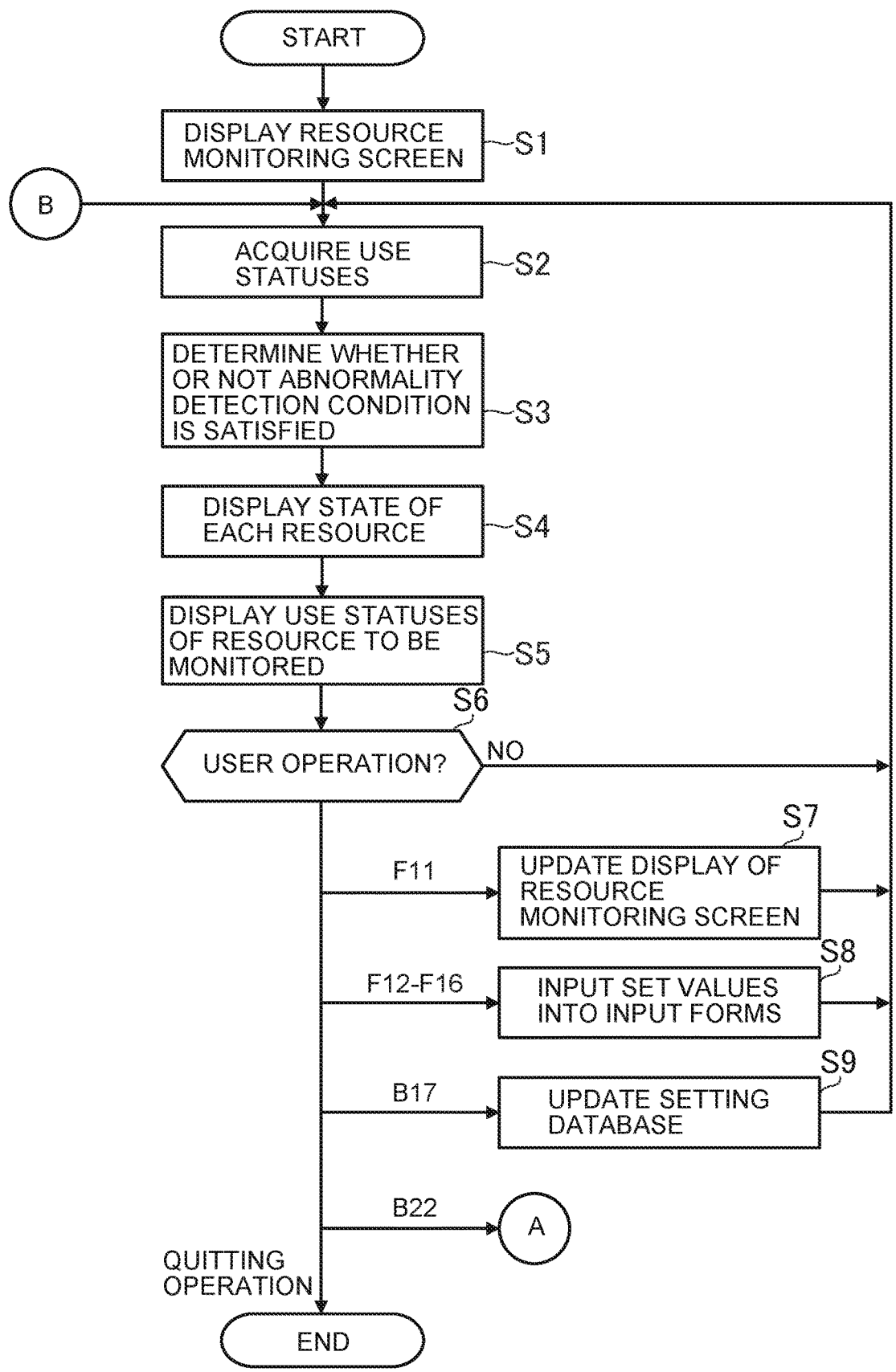
FIG. 10 is a flowchart for illustrating processing to be executed in the resource monitoring system.
Figure 11:
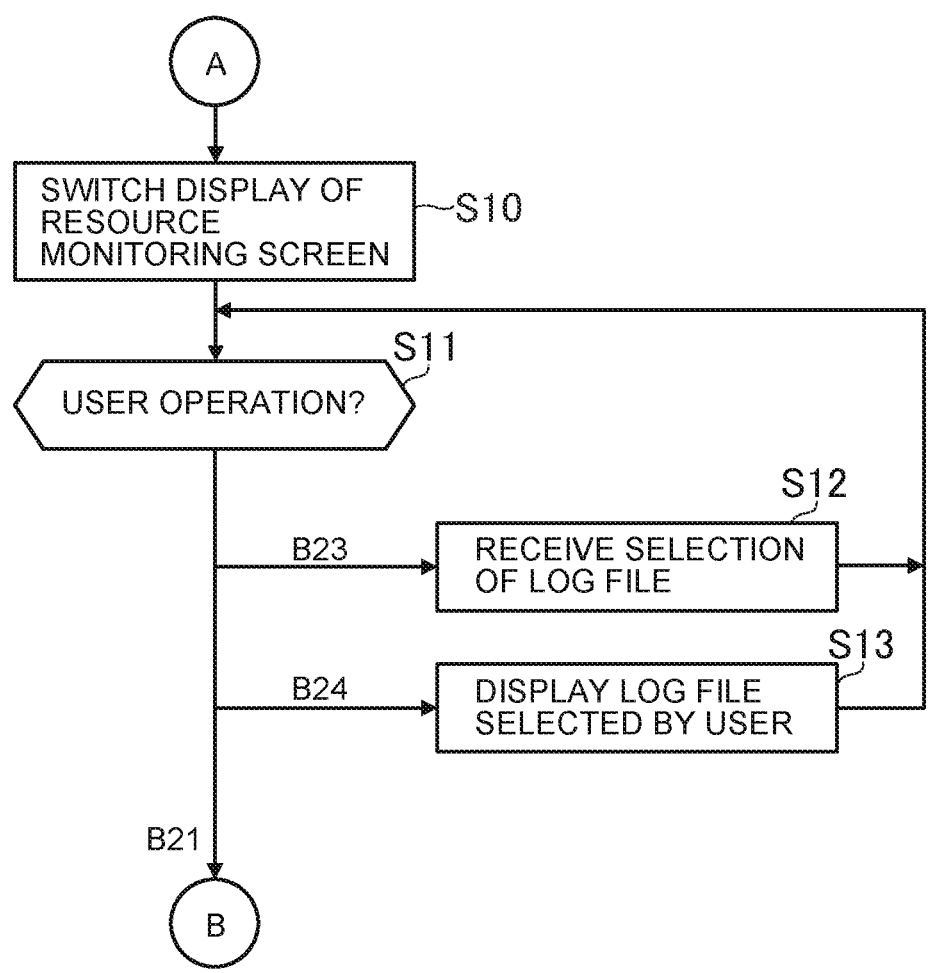
FIG. 11 is a flowchart for illustrating the processing to be executed in the resource monitoring system.

FIG. 10 and FIG. 11 are flowcharts for illustrating the processing to be executed in the resource monitoring system 1. The processing illustrated in FIG. 10 and FIG. 11 is executed in the user terminal 10 by the CPU 11 operating in accordance with a program stored in the storage 12. The processing illustrated in FIG. 10 and FIG. 11 is an example of the processing to be executed by the functional blocks illustrated in FIG. 6.

As illustrated in FIG. 10, the CPU 11 first displays the resource monitoring screen G on the display 15 based on the setting database DB1 when a predetermined operation is executed from the operation interface 14 (Step S1). In Step S1, the CPU 11 inputs "CPU" to the input form F11, and determines values of the input forms F12 to F16 based on the set values stored in the setting database DB1. It is assumed that the buttons B19 and B21 are selected by default. Moreover, on this occasion, a description is given of a case in which the use statuses of the CPU 11 is first displayed, but the use statuses of the RAM 12A or the hard disk 12B may be displayed first.

The CPU 11 acquires the respective use statuses of the CPU 11, the RAM 12A, and the hard disk 12B based on the setting database DB1 (Step S2). In Step S2, the CPU 11 acquires the use status of each of the applications AP to be monitored based on the monitoring interval, and temporarily stores the use status in the storage 12. For a resource to which the output to a log file is set, the CPU 11 outputs a log file indicating the use status of the resource, and stores the log file in the log file database DB2.

The CPU 11 determines whether or not the use status of each of the resources in Step S2 satisfies the abnormality detection condition based on the setting database DB1 (Step S3). In Step S3, the CPU 11 refers to the threshold values set to each of the resources, and calculates the period of each of "Error", "Warning", and "Normal". The CPU 11 determines whether or not the abnormality detection condition is satisfied based on the orders of the respective periods.

The CPU 11 displays the state of each of the resources in the display area A10 based on the determination result obtained in Step S3 (Step S4). In Step S4, the CPU 11 displays any one of "CRITICAL", "WARNING", and "NORMAL" determined in Step S3 in the display area A10 for each of the resources.

The CPU 11 arranges the use statuses of the resource to be monitored as a graph, and displays the graph in the display area A18 (Step S5). In Step S5, the CPU 11 identifies the resource to be monitored input to the input form F11, arranges the use statuses of the resource to be monitored out of the use statuses acquired in Step S2 as a graph, and displays the graph in the display area A18.

The CPU 11 identifies an operation of the user based on a detection signal of the operation interface 14 (Step S6). It is assumed that any one of the operation of inputting information into anyone of the input forms F11 to F16, the operation of selecting the button B22, and the operation of quitting from the resource monitoring screen G is executed in this state. A description is not given of processing to be executed when one of the buttons B19 and B20 is selected. Moreover, when a specific operation is not executed, the CPU 11 returns to the processing of Step S2, and the acquisition of the use statuses and the like are repeated.

When the resource to be monitored is changed from the input form F11 (F11 in Step S6), the CPU 11 changes the resource to be monitored, and updates the display of the resource monitoring screen G (Step S7). In Step S7, the CPU 11 displays the setting values for the resource to be monitored after the change in the input forms F12 to F16 based on the setting database DB1. Moreover, the CPU 11 displays the use statuses of the resource to be monitored acquired in Step S3 in the display area A18.

In Step S6, when the setting is input from any one of the input forms F12 to F16 (any one of F12 to F16 in Step S6), the CPU 11 inputs a setting value input by the user into the input form (Step S8). In Step S8, for example, when the user inputs the monitoring interval into the input form F12, the CPU 11 inputs the monitoring interval into the input form F12. Moreover, for example, when the user inputs the display interval into the input form F13, the CPU 11 inputs the display interval into the input form F13. Further, for example, when the user selects the application AP to be monitored from the input form F14, the CPU 11 controls the checkbox of the input form F14. Still further, for example, when the user inputs the threshold value into the input form F15, the CPU 11 inputs the threshold value into the input form F15. Yet further, for example, when the user selects whether or not to output the monitoring result from the input form F16, the CPU 11 reflects the selection to the checkbox of the input form F14.

In Step S6, when the button B17 is selected (B17 in Step S6), the CPU 11 updates the setting database DB1 based on details of input to the respective input forms F12 to F16 (Step S9), and returns to the processing of Step S2. In Step S9, the CPU 11 associates the resource to be monitored input in the input form F11 with the values input in the respective input forms F12 to F16, and stores the resource and the values in the setting database DB1. The CPU 11 returns to the processing of Step S2, and then, the use statuses of the resource are acquired based on the updated set values.

In Step S6, when the button B22 is selected (B22 in Step S6), the processing proceeds to FIG. 11, and the CPU 11 switches the display of the resource monitoring screen G (Step S10). In Step S10, the resource monitoring screen G is brought into the state illustrated in FIG. 3. A log file has not been selected at this time point, and it is thus assumed that no information is displayed in the display areas A25.

The CPU 11 identifies an operation of the user based on the detection signal of the operation interface 14 (Step S11). It is assumed here that an operation of selecting any one of the buttons B21, B23, and B24 is executed.

When the button B23 is selected (B23 in Step S11), the CPU 11 receives the selection of a log file by the user based on the detection signal of the operation interface 14 (Step S12). In Step S12, the CPU 11 receives specifications of a storage location and a file name of the log file by the user.

In Step S11, when the button B24 is selected (B24 in Step S11), the CPU 11 displays the log file selected by the user in the display area A25 based on the log file database DB2 (Step S13). In Step S13, the CPU 11 reads out the log file selected by the user in Step S12, and displays a graph in the display area A25.

In Step S11, when the button B21 is selected (B21 in Step S11), the CPU 11 returns to the processing of Step S2. In this case, the resource monitoring screen G is brought into the state of FIG. 2. When a quitting operation is executed in Step S6 (quitting operation in Step S6), this processing is finished.

With the resource monitoring system 1, the use statuses of the resource by the applications AP for analyzing the operation of the industrial device is displayed on the resource monitoring screen G to allow the user to check the use statuses of the resource, to thereby allow the applications AP to appropriately use the resource of the user terminal 10. Consequently, the applications AP appropriately use the resources of the user terminal 10, and it is thus possible to prevent a case in which, when important analysis is required, the operation of the industrial device cannot be sufficiently analyzed because the resources of the user terminal 10 are excessively used. Therefore, it is possible to appropriately analyze the operation of the industrial device, to thereby allow the industrial device to normally operate. Moreover, when specifications of the user terminal 10 are insufficient for the execution of the application AP, it is possible to notify the user of this state so that the user can consider an increase in performance of the user terminal 10.

Moreover, the use statuses of the resource by the respective applications AP are displayed on the resource monitoring screen G to allow the user to check the use statuses of the resource by each of the applications AP, to thereby enable each of the plurality of applications AP to appropriately use the resource of the user terminal 10. Which application AP is excessively using the resource can be identified by allowing the user to check the use statuses of the respective applications AP. Therefore, it is possible to prevent, for example, a case in which a certain application is excessively using the resource and the operations of other applications consequently become unstable.

Moreover, the total use status obtained by summing the use statuses of the resource by the respective applications AP is displayed on the resource monitoring screen G to allow the user to check the total use status, to thereby allow each of the plurality of applications AP to appropriately use the resource of the user terminal 10. It is possible to allow the user to more easily determine whether or not the applications AP are excessively using the resource of the user terminal 10 as a whole, by allowing the user to check the total use status. Therefore, it is possible to prevent, for example, a case in which the resource of the user terminal 10 is excessively used as a whole and the operations of the respective applications AP consequently become unstable.

Moreover, it is possible to display the change in the use status of the resource before and after an application AP is added to the user terminal 10 on the resource monitoring screen G, to thereby allow the user to check the influence on the resource by the addition of the application AP to the user terminal 10.

Moreover, the user is more likely notice that the abnormality is occurring in the use of the resource by issuing the abnormality notification when the use status of the resource satisfies the abnormality detection condition.

5. Modification Examples

The present invention is not limited to at least one embodiment described above, and can be modified suitably without departing from the spirit of the present invention.

Figure 12:
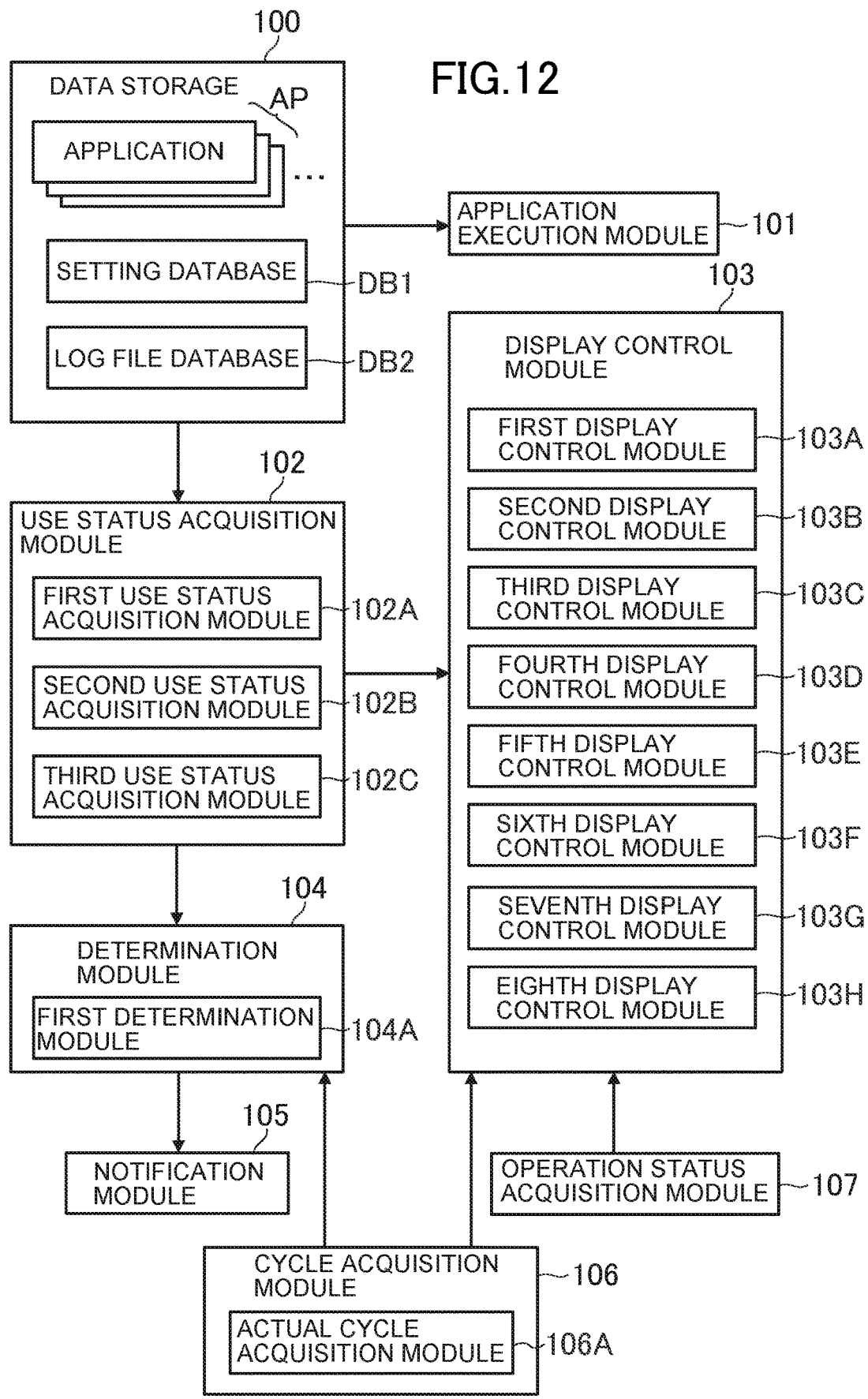
FIG. 12 is a functional block diagram for illustrating modification examples of the present invention.

FIG. 12 is a functional block diagram for illustrating modification examples of the present invention. As illustrated in FIG. 12, in the modification examples described below, a fourth display control module 103D, a fifth display control module 103E, a sixth display control module 103F, a seventh display control module 103G, an eighth display control module 103H, a first determination module 104A, a cycle acquisition module 106, an actual cycle acquisition module 106A, and an operation status acquisition module 107 are implemented. Those functions are mainly implemented by the CPU 11.

(1) For example, in at least one embodiment, a description is given of the case in which it is determined whether or not the abnormality detection condition is satisfied based on the ratio of "Error" or the like to the display interval set to the resource, but it may be determined whether or not the abnormality detection condition is satisfied based on the ratio of "Error" or the like to the cycle of the robot 22.

The robot 22 cyclically operates based on predetermined cycle information. The cycle information is only required to be stored in the robot system 20, and may be stored in, for example, a memory of the robot controller 21 or a memory included in the robot 22. The cycle information is a planned or set cycle. The cycle is a cycle of an operation process, and is also referred to as "control cycle". The robot 22 repeats a predetermined operation, and hence the cycle information indicates a cycle of the repetition of the operation.

For example, the robot controller 21 uses a real-time clock and the like to execute time counting processing, to thereby determine whether or not a start time point of the cycle has been reached. When the start, time point of the cycle has been reached, the robot controller 21 instructs the robot 22 to execute a predetermined operation. It is assumed that the operation of the robot 22 in one cycle is defined in advance, and is stored in the memory of the robot controller 21. The robot 22 operates based on an instruction from the robot controller 21, to thereby execute a cyclic operation.

In the resource monitoring system 1 according to Modification Example (1) of the present invention, the cycle acquisition module 106 and the first determination module 104A are implemented. The cycle acquisition module 106 is configured to acquire the cycle of the robot 22. For example, the cycle acquisition module 106 acquires a planned or set cycle indicated by the cycle information. In Modification Example (1), the cycle information is stored in the robot system 20, and hence the cycle acquisition module 106 acquires the cycle information from the robot system 20, to thereby acquire the planned or set cycle of the robot 22.

The first determination module 104A is configured to determine whether or not the abnormality detection condition is satisfied based on a ratio of a period in which the use status is a predetermined situation to the cycle. In Modification Example (1), the first determination module 104A determines whether or not the abnormality detection condition is satisfied based on a ratio of the period in which the use status is the predetermined situation to the planned or set cycle indicated by the cycle information. The first determination module 104A calculates ratios of periods of the respective states of "Error", "Warning", and "Normal" to the cycle acquired by the cycle acquisition module 106, to thereby determine the order thereof. While the ratios to the display interval are calculated in at least one embodiment, Modification Example (1) is different in that the ratios to the cycle acquired by the cycle acquisition module 106 are calculated, and the processing of the first determination module 104A is as described in at least one embodiment in other points.

The cycle acquisition module 106 may acquire an actual cycle as in Modification Example (3) of the present invention described later. In this case, the first determination module 104A may determine whether or not the abnormality detection condition is satisfied based on a ratio of the period in which the use status is the predetermined situation to the actual cycle.

According to Modification Example (1), it is possible to detect whether the abnormality is sudden or steady by determining whether or not the abnormality detection condition is satisfied based on the ratio of the period in which the use status of the resource is the predetermined situation to the cycle of the robot 22.

(2) Moreover, for example, the use status in each cycle of the robot 22 may be displayed on the resource monitoring screen G. For example, the scale (in units of plot) of the time axis of the graph displayed in the display area A18 may not be a fixed value, but may be determined in accordance with the cycle of the robot 22.

In the resource monitoring system 1 according to Modification Example (2) of the present invention, the cycle acquisition module 106 and the fourth display control module 103D are implemented. The processing of the cycle acquisition module 106 is the same as that described in Modification Example (1). Also in Modification Example (2), a description is given of the case in which the cycle acquisition module 106 acquires the planned or set cycle indicated by the cycle information, but the actual cycle of the robot 22 may be acquired as in Modification Example (3) described later.

The fourth display control module 103D displays the use status in each cycle on the resource monitoring screen G. The use status in each cycle is a use status in one cycle. For example, the fourth display control module 103D displays a change in the use status in each cycle on the resource monitoring screen. In Modification Example (2), the fourth display control module 103D determines, based on the cycle, the scale (in units of plot) of the time axis of the graph to be displayed in the display area A18.

For example, the fourth display control module 103D determines the scale of the time axis of the graph so that the change in the use status in the one cycle is displayed in the display area A18. The fourth display control module 103D may display only the use status in the one cycle as a graph in the display area A18, or may display the use status in a plurality of cycles as a graph in the display area A18. For example, the fourth display control module 103D may display the use status in two cycles in the graph of the display area A18, or may display the use status in the first cycle and the use status in the second cycle so as to be distinguished from each other. Similarly, the fourth display control module 103D may display the use status in three or more cycles.

The processing to be executed by the fourth display control module 103D is not limited to the above-mentioned example. The fourth display control module 103D is only required to display the use status in each cycle, and may display an average value of the use status in one cycle, for example.

According to Modification Example (2), the use status of the resource in each cycle of the robot 22 is displayed on the resource monitoring screen G to allow the user to check the use status of the resource in each cycle, to thereby allow the application AP to more appropriately use the resource of the user terminal 10. When abnormality occurs in the use status of the resource, it is possible to detect whether the abnormality is sudden or steady. When the robot 22 is executing an important operation in the cycle, it is possible to allow the user to determine whether or not the resource is excessively used.

(3) Moreover, for example, a description is given of the case in which the cycle acquisition module 106 acquires the planned or set cycle, but the cycle acquisition module 106 may use the actual cycle measured on the robot system 20 side.

In Modification Example (3), the robot controller 21 starts counting of time when a start time point of the cycle is reached, and measures a period until a completion notification of the last operation in the one cycle is received from the robot 22, to thereby calculate the actual cycle. Moreover, for example, the robot controller 21 may measure the cycle for a plurality of times to calculate an average value, to thereby calculate the actual cycle. Not the robot controller 21, but the robot 22 itself may measure the actual cycle. In this case, the robot 22 starts counting of time when the first operation instruction in one cycle is received from the robot controller 21, and measures a period until the last operation in the one cycle is completed, to thereby measure the actual cycle.

In the resource monitoring system 1 according to Modification Example (3), the actual cycle acquisition module 106A and the fifth display control module 103E are implemented. The actual cycle acquisition module 106A is configured to acquire the actual cycle of the robot 22. The actual cycle is the cycle measured by the robot system 20. The actual cycle acquisition module 106A is configured to acquire the actual cycle of the robot 22 from the robot system 20. The actual cycle acquisition module 106A transmits an acquisition request for the actual cycle to the robot system 20. When the robot system 20 receives the acquisition request, the robot system 20 transmits the actual cycle measured as describe above to the user terminal 10. The robot system 20 may always measure the cycle, or may measure the cycle in response to the reception of the acquisition request from the user terminal 10.

The fifth display control module 103E displays the use status in each actual cycle on the resource monitoring screen G. The processing of the fifth display control module 103E is different from that of the fourth display control module 103D only in that the unit of display of the use status is the actual cycle, and is as described above in Modification Example (2) in other points. For example, the fourth display control module 103D determines the scale (unit of plot) of the time axis of the graph to be displayed in the display area A18 based on the actual cycle, and calculates and displays an average value of the use status in the actual cycle.

According to Modification Example (3), the use status of the resource in each actual cycle of the robot 22 is displayed on the resource monitoring screen G to allow the user to check the use status of the resource in each actual cycle, to thereby allow the user to check the use status of the resource in accordance with the actual operation of the robot 22.

(4) Moreover, for example, a description is given of the case in which the use status in each cycle is displayed on the resource monitoring screen G in Modification Examples (2) and (3), but the cycle itself may be displayed on the resource monitoring screen G.

In the resource monitoring system 1 according to Modification Example (4) of the present invention, the cycle acquisition module 106 and the sixth display control module 103F are implemented. The processing of the cycle acquisition module 106 is the same as that described in Modification Examples (1) to (3). Also in Modification Example (4), a description is given of the case in which the cycle acquisition module 106 acquires the planned or set cycle indicated by the cycle information, but the actual cycle of the robot 22 may be acquired as in Modification Example (5) of the present invention described later.

The sixth display control module 103F is configured to display the use status together with the cycle on the resource monitoring screen G. For example, the sixth display control module 103F displays a numerical value indicating the cycle together with the graph in the display area A18 of the resource monitoring screen G. Moreover, for example, the sixth display control module 103F may display the numerical value indicating the cycle at a location different from the display area A18 of the resource monitoring screen G. The cycle may not be displayed as the numerical value. For example, the cycle may be displayed through use of an icon or the like.

According to Modification Example (4), the use status of the resource together with the cycle of the robot 22 is displayed on the resource monitoring screen G to allow the user to check the use status of the resource together with the cycle, to thereby allow the application AP to more appropriately use the resource of the user terminal 10. When abnormality occurs in the use status of the resource, it is possible to detect whether the abnormality is sudden or steady. When the robot 22 is executing an important operation in the cycle, it is possible to allow the user to determine whether or not the resource is excessively used.

(5) Moreover, for example, in Modification Example (4), a description is given of the case in which the planned or set cycle is displayed together with the use status of the resource, but the actual cycle measured on the robot system 20 side may be displayed.

In the resource monitoring system 1 according Modification Example (5) of the present invention, the actual cycle acquisition module 106A and the seventh display control module 103G are implemented. The processing of the actual cycle acquisition module 106A is the same as that described in Modification Example (3). The seventh display control module 103G is configured to display the use status together with the actual cycle on the resource monitoring screen G. The processing of the seventh display control module 103G is different from that of the sixth display control module 103F only in that the actual cycle is displayed, and is as described above in Modification Example (4) in other points.

According to Modification Example (5), the use status of the resource together with the actual cycle of the robot 22 is displayed on the resource monitoring screen G to allow the user to check the use status of the resource together with the actual cycle, to thereby allow the user to check the use status of the resource in accordance with the actual operation of the robot 22.

(6) Moreover, for example, a situation of the site of the robot system 20 may be displayed on the resource monitoring screen G. The site is a location at which the robot 22 is installed, and is, for example, a plant or a working site. The situation of the site is a state of the site, and may be, for example, an operation status of a machine other than the robot 22, or a production situation of a product. The situation of the site may be expressed in any data format, and may be, for example, operation data on the machine other than the robot 22, or a period required to produce the product. Moreover, for example, the situation of the site may be an image taken by a camera installed on the site, or a sound detected by a microphone installed on the site. In Modification Example (6) of the present invention, the robot controller 21 acquires the situation of the site through the above-mentioned method.

In the resource monitoring system 1 according to Modification Example (6), the operation status acquisition module 107 and the eighth display control module 103H are implemented. The operation status acquisition module 107 is configured to acquire the operation status of the site on which the robot 22 operates. The operation status acquisition module 107 transmits an acquisition request for the operation status to the robot system 20. When the robot system 20 receives the acquisition request, the robot system 20 transmits the operation status acquired as describe above to the user terminal 10. The robot system 20 may always acquire the operation status, or may acquire the operation status in response to the reception of the acquisition request from the user terminal 10.

The eighth display control module 103H is configured to display the use status together with the operation status of the site on the resource monitoring screen G. For example, the eighth display control module 103H displays an image indicating the operation status of the site together with the graph in the display area A18 of the resource monitoring screen G. Moreover, for example, the eighth display control module 103H may display the image indicating the operation status of the site at a place different from the display area A18 of the resource monitoring screen G. The operation status of the site may be displayed as a moving image, or may be displayed through use of a numerical value or icon indicating the operation status of the site, for example. Moreover, for example, the operation status of the site may be displayed as a moving image with sound.

According to Modification Example (6), the use status of the resource together with the operation status of the site on which the robot 22 operates is displayed on the resource monitoring screen G to allow the user to check the use status of the resource together with the operation status of the site, to thereby allow the application AP to more appropriately use the resource of the user terminal 10.

(7) Moreover, for example, the above-mentioned modification examples may be combined with one another.

Further, for example, a description has been given of the case in which the user terminal 10 itself, which executes the application AP, displays the resource monitoring screen G, but another computer may display the resource monitoring screen G. That is, a computer that executes the application program AP and a computer that displays the resource monitoring screen G may be the same or different. Moreover, for example, the computer that executes the application AP may be a server computer. Moreover, for example, the computer that displays the resource monitoring screen G may be a server computer. Moreover, for example, a description has been given of the case in which each function is implemented in the user terminal 10, but the respective functions may be implemented by a plurality of computers in a distributed manner. Moreover, for example, a description has been given of the case in which an example of circuitry is the CPU 11 of the user terminal 10, but circuitry may be a CPU of another computer which includes same structures as the user terminal 10.

Further, at least one embodiment described above is given as specific examples, and is not to limit the invention disclosed herein to the very configuration and data storage examples of the specific example. A person skilled in the art may make various modifications to the disclosed at least one embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

The invention claimed is:

1. A resource monitoring system, comprising:
   a computer comprising a CPU configured to execute an application for analyzing an operation of an industrial device that is a robot, a motor controller, a servomotor, an inverter, a machine tool, or a programmable logic controller;
   wherein the industrial device is configured to cyclically operate based on predetermined cycle information, and
   circuitry configured to:
      acquire a use status of a hardware resource of the computer by the application;
         wherein the use status is a usage rate of the CPU;
      acquire a cycle of the industrial device;
      display the use status on a resource monitoring screen;
      determine whether the use status satisfies a predetermined abnormality detection condition;
      issue a predetermined abnormality notification when the predetermined abnormality detection condition is satisfied based on a ratio of a first period in which the use status is a predetermined situation compared to a threshold period of the cycle,
   wherein the predetermined abnormality detection condition is satisfied when the ratio is equal to or larger than a predetermined threshold, and
   wherein the circuitry is further configured to allow the user to check the use status.

2. The resource monitoring system according to claim 1,
   wherein the computer is configured to execute each of a plurality of applications, and
   wherein the circuitry is configured to:
      acquire the use status of each of the plurality of applications; and
      display the use status of each of the plurality of applications on the resource monitoring screen.

3. The resource monitoring system according to claim 2,
   wherein the computer is configured to execute each of a plurality of applications, and
   wherein the circuitry is configured to:
      acquire a total use status obtained by summing the respective use statuses of the plurality of applications; and
      display the total use status on the resource monitoring screen.

4. The resource monitoring system according to claim 2,
   wherein the circuitry is configured to:
      acquire a change in the use status before and after the application is added to the computer; and
      display the change in the use status on the resource monitoring screen.

5. The resource monitoring system according to claim 1,
   wherein the computer is configured to execute each of a plurality of applications, and
   wherein the circuitry is configured to:
      acquire a total use status obtained by summing the respective use statuses of each of the plurality of applications; and display the total use status on the resource monitoring screen.

6. The resource monitoring system according to claim 5, wherein the circuitry is configured to:
   acquire a change in the use status before and after the application is added to the computer; and
   display the change in the use status on the resource monitoring screen.

7. The resource monitoring system according to claim 1, wherein the circuitry is configured to:
   acquire a change in the use status before and after the application is added to the computer; and
   display the change in the use status on the resource monitoring screen.

8. The resource monitoring system according to claim 1, wherein the circuitry is configured to: display the use status in each cycle on the resource monitoring screen.

9. The resource monitoring system according to claim 8, wherein the circuitry is configured to:
   acquire an actual cycle of the industrial device; and
   display the use status in each actual cycle on the resource monitoring screen.

10. The resource monitoring system according to claim 1, wherein the circuitry is configured to: display the use status together with the cycle on the resource monitoring screen.

11. The resource monitoring system according to claim 10, wherein the circuitry is configured to:
    acquire an actual cycle of the industrial device; and
    display the use status together with the actual cycle on the resource monitoring screen.

12. The resource monitoring system according to claim 1, wherein the circuitry is configured to:
    acquire an operation status of a site on which the industrial device operates; and
    display the use status together with the operation status of the site on the resource monitoring screen.

13. The resource monitoring system according to claim 1, wherein:
    the industrial device is a controller that controls one or more motors,
    the application analyzes an action relating a motor control, and
    the use status is a use status of a resource for analyzing the action relating to the motor control.

14. The resource monitoring system according to claim 1, wherein the threshold period is a fixed value.

15. The resource monitoring system according to claim 1, wherein the threshold period is a variable value.

16. The resource monitoring system according to claim 1, wherein the threshold period is the cycle of the industrial device.

17. The resource monitoring system according to claim 1, wherein the first period is the amount of time an industrial device is in the use status during one cycle.

18. The resource monitoring system according to claim 1, wherein the predetermined situation is either an error use status or a warning use status.

19. A resource monitoring method, comprising:
    acquiring a use status of a hardware resource of a computer that comprises a CPU by an application for analyzing an operation of an industrial device that is a robot, a motor controller, a servomotor, an inverter, a machine tool, or a programmable logic controller, the computer executing the application and the use status being a usage rate of the CPU; and
    wherein the industrial device is configured to cyclically operate based on predetermined cycle information,
    displaying the use status on a resource monitoring screen;
    wherein the computer is configured to:
    acquire a cycle of the industrial device;
    determine whether the use status satisfies a predetermined abnormality detection condition;
    issue a predetermined abnormality notification when the predetermined abnormality detection condition is satisfied based on a ratio of a period in which the use status is a predetermined situation compared to a threshold period of the cycle,
    wherein the predetermined abnormality detection condition is satisfied when the ratio is equal to or larger than a predetermined threshold, and
    wherein the circuitry is further configured to allow the user to check the use status.

20. A non-transitory information storage medium storing a program for causing a computer to:
    acquire a use status of a hardware resource of the computer that comprises a CPU by an application for analyzing an operation of an industrial device that is a robot, a motor controller, a servomotor, an inverter, a machine tool, or a programmable logic controller, the computer executing the application and the use status being a usage rate of the CPU; and
    wherein the industrial device is configured to cyclically operate based on predetermined cycle information,
    display the use status on a resource monitoring screen;
    wherein the computer is configured to:
    acquire a cycle of the industrial device;
    determine whether the use status satisfies a predetermined abnormality detection condition;
    issue a predetermined abnormality notification when the predetermined abnormality detection condition is satisfied based on a ratio of a period in which the use status is a predetermined situation compared to a threshold period of the cycle,
    wherein the predetermined abnormality detection condition is satisfied when the ratio is equal to or larger than a predetermined threshold, and
    wherein the circuitry is further configured to allow the user to check the use status.

* * * * *